United States Patent [19]
McConnell et al.

[11] Patent Number: 5,488,861
[45] Date of Patent: Feb. 6, 1996

[54] WHEEL BALANCER APPARATUS AND METHOD

[75] Inventors: Allen D. McConnell, Maumelle; Hanford D. Monroe, Conway; Jean O. W. deBellefeuille, Jr., Maumelle, all of Ark.

[73] Assignee: FMC Corporation, Chicago, Ill.

[21] Appl. No.: 311,624

[22] Filed: Sep. 23, 1994

Related U.S. Application Data

[62] Division of Ser. No. 941,577, Sep. 4, 1992, Pat. No. 5,377,542.

[51] Int. Cl.⁶ ................................................. G01M 1/16
[52] U.S. Cl. ................................................. 73/462
[58] Field of Search ........................... 73/462, 460, 467, 73/483, 486, 487

[56] References Cited

U.S. PATENT DOCUMENTS

| | | | |
|---|---|---|---|
| 4,155,255 | 5/1979 | Sherman et al. | 73/462 |
| 4,169,383 | 10/1979 | Guyot et al. | 73/462 |
| 4,450,529 | 5/1984 | Hill et al. | 73/462 |
| 5,081,865 | 1/1992 | Schecter et al. | 73/483 |

*Primary Examiner*—Hezron E. Williams
*Assistant Examiner*—Helen C. Kwok
*Attorney, Agent, or Firm*—Michael B. K. Lee; Douglas W. Rudy

[57] ABSTRACT

The invention provides a wheel balancer with a filtering system that reduces signal noise using a phase shift and subtraction circuit. In addition the inventive wheel balancer utilizes an automated parameter entry device, and a fast data refresh system which reduces the burden on the central processing unit CPU.

3 Claims, 5 Drawing Sheets

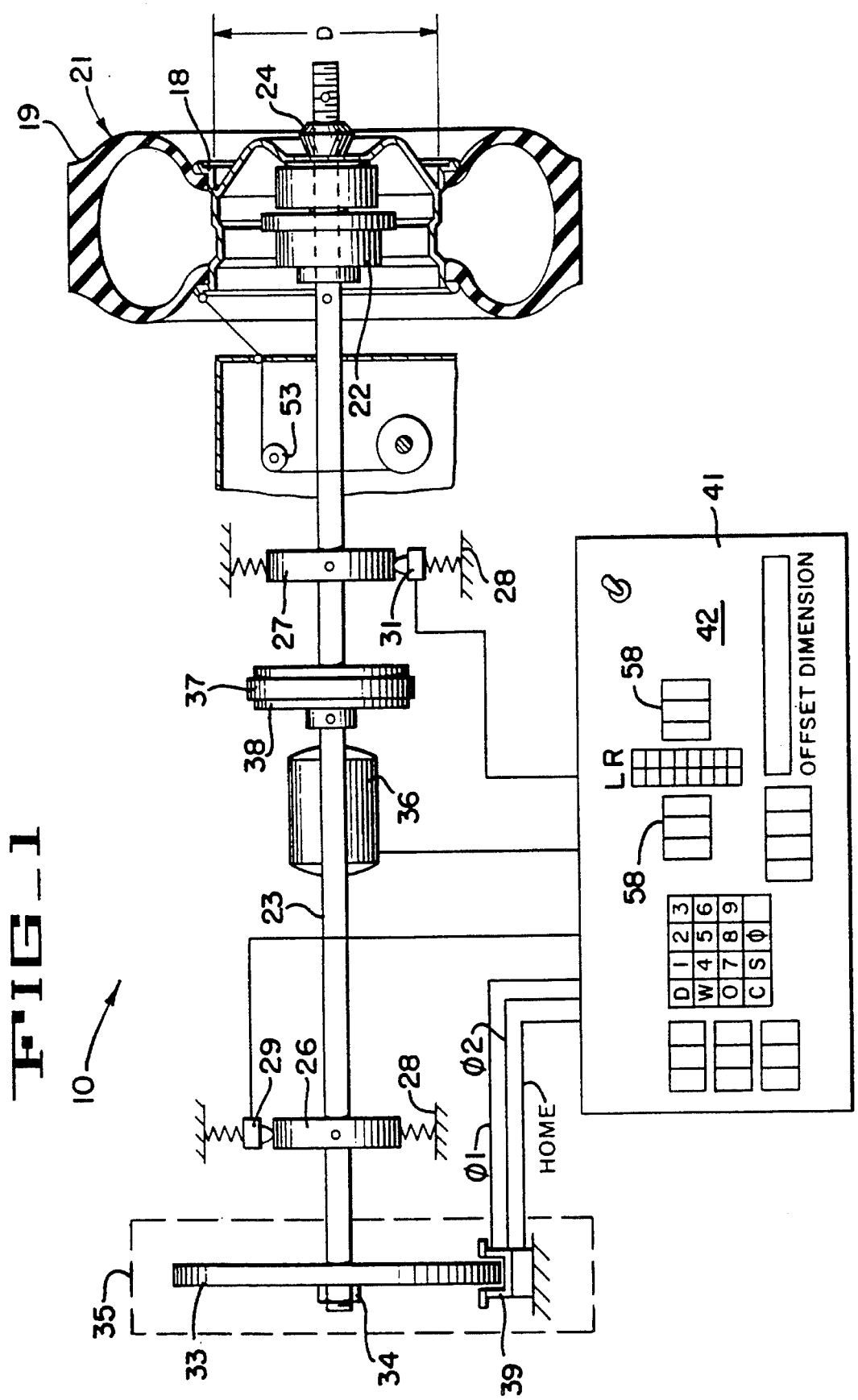
FIG_1

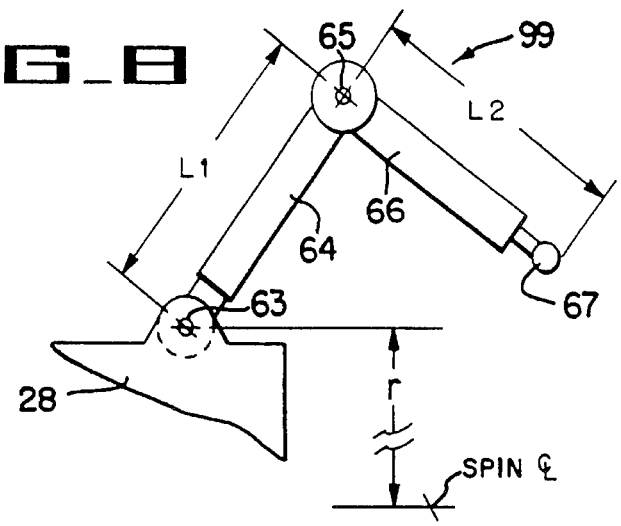
FIG_8
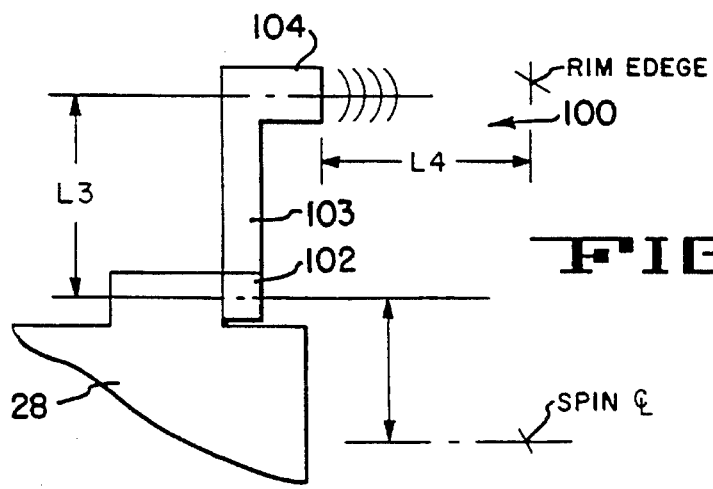
FIG_9
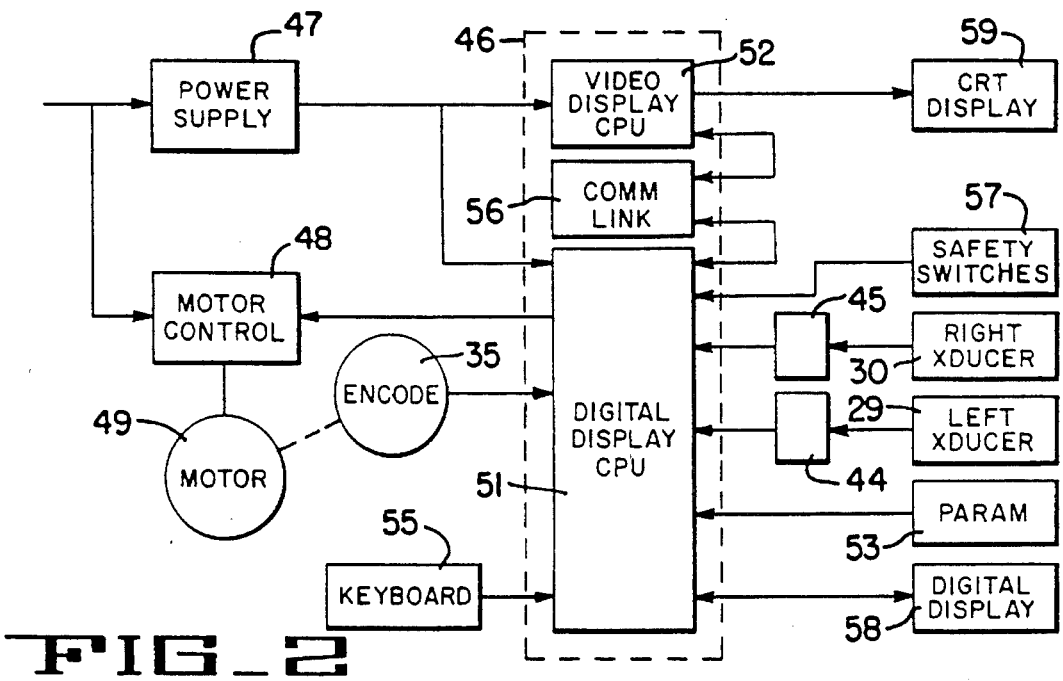
FIG_2

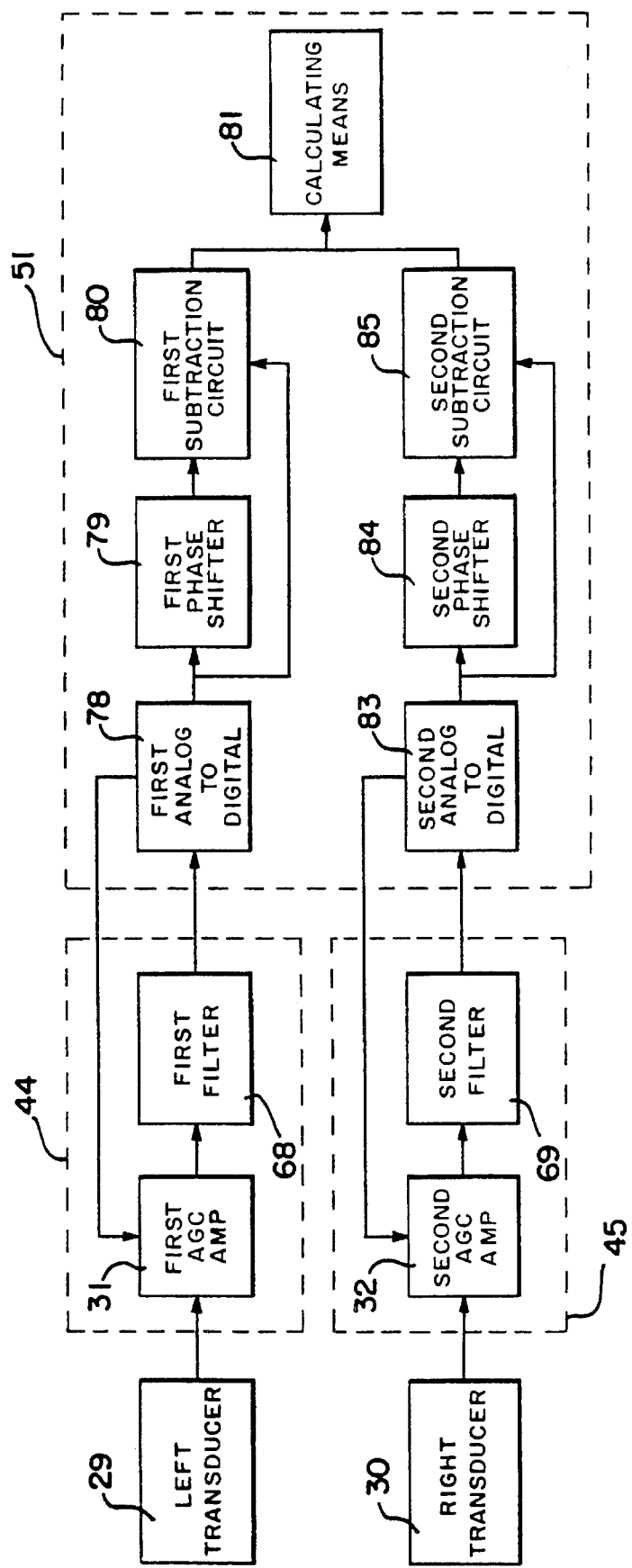
FIG_3

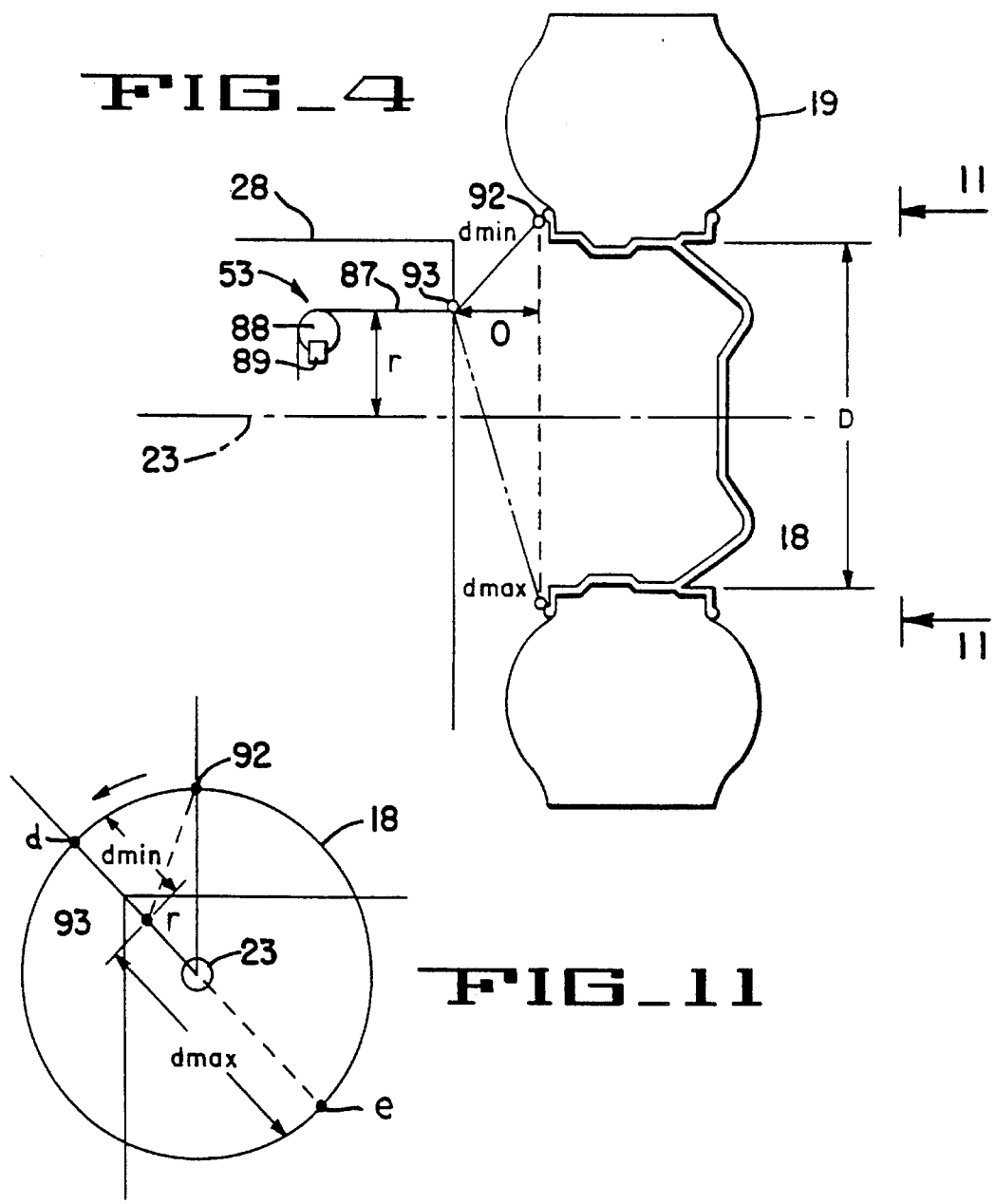
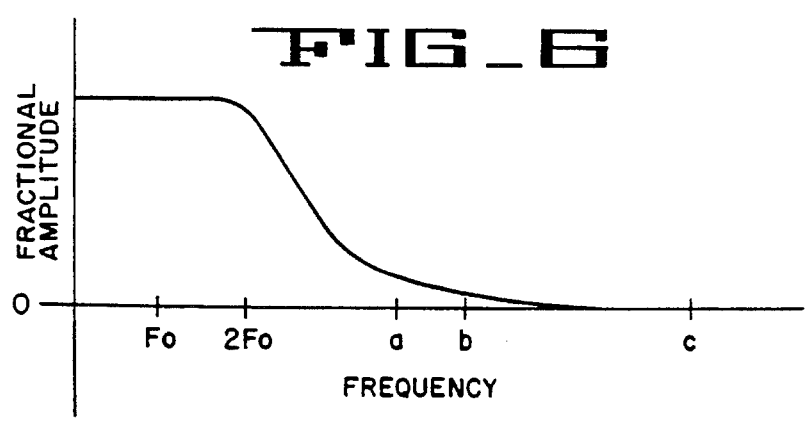

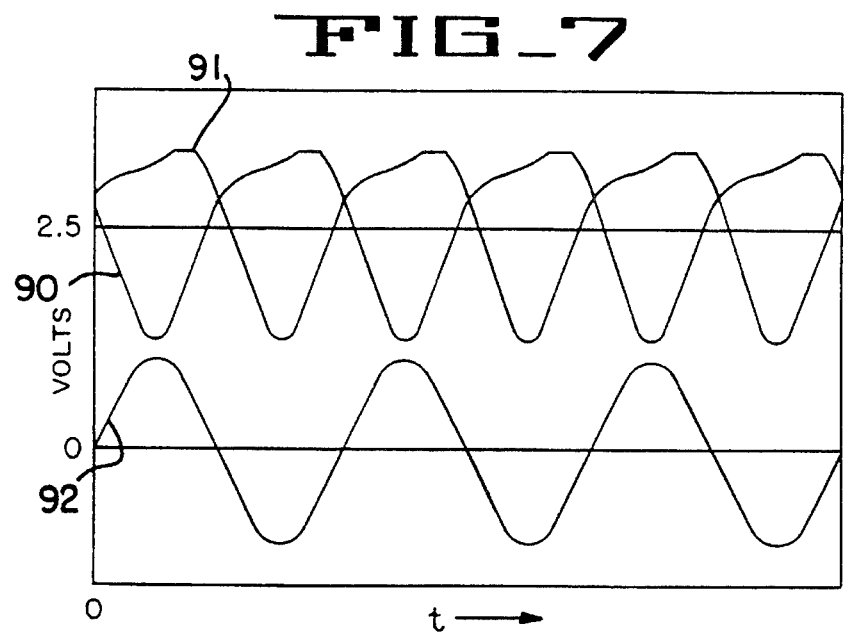
FIG_7
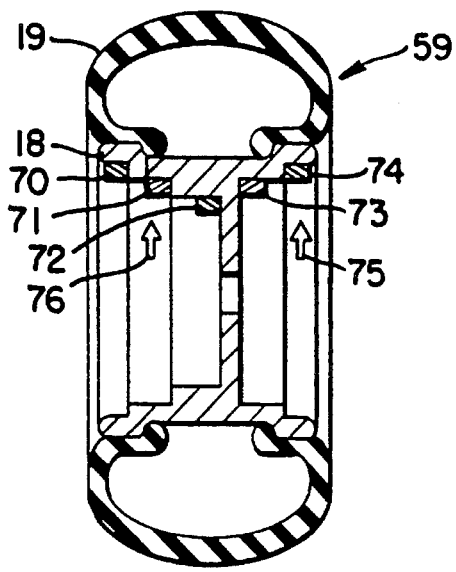
FIG_8
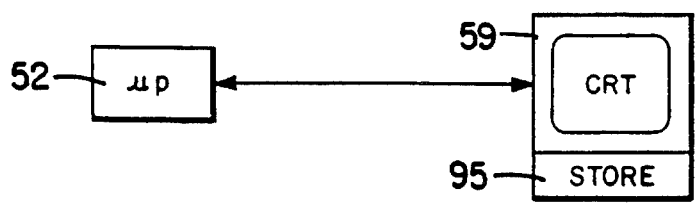
FIG_10

WHEEL BALANCER APPARATUS AND METHOD

This is a division of application Ser. No. 07/941,577, filed Sep. 4, 1992, now U.S. Pat. No. 5,377,542.

BACKGROUND OF THE INVENTION

In wheel balancers, a wheel balancer specifies a weight to be placed on a wheel in order to balance the wheel.

SUMMARY OF THE INVENTION

The invention provides a wheel balancer that is easier to use.

BRIEF DESCRIPTION OF THE DRAWING

FIG. 1 illustrates a sectional view of a hard mount wheel balancer which is utilized in an embodiment of the invention.

FIG. 2 is a schematic illustration of the electrical system of the invention used in the embodiment illustrated in FIG. 1.

FIG. 3 is a more detailed drawing of the schematic illustration in FIG. 2 illustrating the transducers, filters, and part of the digital display CPU.

FIG. 4 is a more detailed view of a parameter entry device illustrated in FIG. 1.

FIG. 5 illustrates a display screen showing the cross-section of a wheel assembly.

FIG. 6 illustrates an attenuation curve of a filter.

FIG. 7 illustrates a plot of a first signal which has passed through a filter and a second signal which is a 180° shift of the first signal and a third signal which is the difference between the first signal and the second signal, plotting voltage versus time.

FIG. 8 illustrates another embodiment of the parameter entry device.

FIG. 9 illustrates a third embodiment of the parameter entry device.

FIG. 10 is a schematic view of a display device and storage means.

FIG. 11 illustrates a schematic side view of FIG. 4 along line 11—11.

DESCRIPTION OF THE PREFERRED EMBODIMENTS

As shown in FIG. 1, an automobile rim 18 and tire 19 combination (wheel assembly) 21 is shown as the rotating body securely mounted against a shoulder member 22 which is attached to a rotating shaft 23. The rim portion of the wheel assembly 21 has the usual centrally disposed hole which fits over the end of the shaft 23. The rim is held tightly in place by a wheel clamp 24 which engages threads formed on the end of the shaft 23. A pair of bearing housings 26 and 27 are supported within a fixed, rigid framework forming part of a main balancer body 28. The shaft 23 is supported on inner bearing members within the bearing housings 26 and 27, thereby being disposed for rotational motion within the framework of the main balancer body 28. Left and right force transducers 29 and 31, respectively, are positioned between the framework of the main balancer body 28 and bearing housings 26 and 27. The force transducers 29 and 31 are kept in continuous contact with the bearing housings 26 and 27. A parameter entry device 53 is mounted on the main balancer body 28 adjacent to the wheel assembly 21.

An encoder disc 33 is secured to the end of the shaft 23 opposite the end carrying the rim and tire combination 21 by means of a nut 34 and therefore rotates with the shaft 23. A motor 36 is mounted on the main balancer body 28 functioning to drive the shaft 23 rotationally through a belt 37 and a pulley 38 which is fixedly mounted on the shaft 23. The pulley 38 can be mounted at various places such as between the bearing housings 26 and 27 as shown or between a bearing housing 26 and the encoder disc 33.

A photosensor and light source assembly 39 is mounted on the framework of the balancer main body 28 adjacent to the edge of the encoder disc 33, forming an encoder 35. Signals provided by the encoder 35 are connected to the circuitry contained within a console 41 having a front panel 42 thereon. The signals provided by the photosensor and light source assembly are three in number, with the signals being labeled in FIG. 1 as $\phi 1$, $\phi 2$, and "home" or reference. The mechanical arrangement of the wheel unbalance measuring device as disclosed herein to this point may be of the type described in U.S. Pat. No. 4,046,017 issued to Hill.

FIG. 2 illustrates an schematic diagram of the electrical system of the embodiment of the invention illustrated in FIG. 1. In the preferred embodiment of the invention, a micro-controller 46 comprises a digital display Central Processing Unit CPU 51 electrically connected to a video display CPU 52 by a communications link 56. Signals from the left transducer 29 are fed as input to a first signal conditioner 44 which feeds as output a signal to the digital display CPU 51 of the micro-controller 46. Signals from the right transducer 30 are fed as input to a second signal conditioner 45 which feeds as output a signal to a digital display (CPU) 51. The first signal conditioner 44 and the second signal conditioner 45 feed to the digital display CPU 51. Signals from the parameter entry device 53 are also fed as input to a micro-controller 46. The micro-controller 46 is powered by a power supply 47. A power source supplies electricity to the power supply 47 and a motor control 48, which powers a motor 49. The motor control 48 is electrically connected to digital display CPU 51. Electrically connected is defined as when a first object is electrically connected to a second object, an electrical current or signal may pass from the first object to the second object or from the second object to the first object. A keyboard 55, a plurality of safety switches 57, and a digital display 58 are connected to digital display CPU 51. A CRT display 59 is electrically connected to the video display CPU 52. Some of the safety switches 57 and the digital display 58 may be mounted on the front panel 42 of the console 41 as shown in FIG. 1.

FIG. 3 is a more detailed drawing of the schematic illustration in FIG. 2 illustrating the transducers 29,30, signal conditioners 44,45, and parts of the digital display CPU 51. The left transducer 29 is electrically connected to the first signal conditioner 44 which comprises a first automatic gain control (AGC) amplifier 31, and a first filter 68, which in this embodiment is a LTC 1062 5th order low pass filter made by Linear Technology, which is a digitally controlled analog filter. The digital display CPU 51 comprises a first analog to digital converter 78 which is electrically connected to the first filter 68 and the first a AGC amplifier 31, a first phase shifter 79 which is electronically connected to the first analog to digital converter 78, a first subtraction circuit 80 which is electronically connected to the first analog to digital converter 78 and the first phase shifter 79, and a calculating means 81 electronically connected to the first subtraction circuit 80. The right transducer 30 is electrically connected to the second signal conditioner 45 which comprises a second AGC amplifier 32 and a second filter 69, which in this embodiment is a LTC 1062 5th order low pass filter made by Linear Technology. The digital display CPU 51 further comprises a second analog to digital converter 83 which is electrically connected to the second filter 69 and the second AGC amplifier 32, a second phase shifter 84 which is electronically connected to the second analog to digital converter 83, and a second subtraction circuit 85 which is electronically connected to the second analog to digital converter 83, the second phase shifter 84, and the calculating means 81.

In operation, the wheel assembly 21 is mounted on the rotating shaft 23. The wheel clamp 24 secures the wheel assembly 21. The parameter entry device 53 is use to enter some of the parameters with respect to the wheel assembly 21 into the digital display CPU 46.

FIG. 4 is an enlarged angular view of the parameter entry device 53 as illustrated in FIG. 1. The parameter entry device 53 comprises a cord 87 held against a pulley 88, and a second encoder 89 adjacent to the pulley 88. A first end of the cord 87 with a bead 92 is located a distance r from the center of the rotating shaft 23 at a fixed point 93, which is formed by an aperture in the balancer main body 28. The first end of the cord 87 is drawn away from the fixed point 93 on the balancer body 18 till the bead 92 touches the edge of the rim 18. The rim 18 is rotated a partial turn of 40° around the rotating shaft 23 with the bead 92 against the edge of the rim 18 and with the second encoder 89 adjacent to the pulley 88 measuring the length of the cord 87 by measuring the turn of the pulley 88 and the encoder 35 adjacent to the encoder disk 33 measuring the rotation of the shaft. By correlating the length of the cord and the angle of the shaft, a sine wave of angle versus square of the length of cord can be plotted. This sine wave may be generated by recording two lengths with their angular positions. The valley of the sine wave indicates the angular position of the shaft that allows the shortest distance between the fixed point 93 and the edge of the rim 18 $d_{min}$. The peak of the sine wave indicates the angular position of the shaft that allows the longest distance between the fixed point 93 and the edge of the rim 18 $d_{max}$. FIG. 11 illustrates a schematic side view of FIG. 4 along line 11—11. Point d illustrates the location on the rim 18 which provides $d_{min}$, and point e illustrates the location on the rim 18 which provides $d_{max}$. Since a point on the center of the shaft, the fixed point 93 and points d and e are collinear the point on the edge of the rim 18 that provides the shortest distance between the edge of the rim 18 and the fixed point 93 and the point on the edge of the rim 18 that provides the longest distance between the edge of the rim 18 and the fixed point 93 lie in a plane formed by the center of the rotating shaft 23 and the fixed point 93. Using the sine wave, the longest distance $d_{max}$ between the fixed point 93 and the edge of the rim 18 may be calculated and the shortest distance $d_{min}$ between the edge of the rim 18 and the fixed point 93 may be calculated as shown in FIG. 11. Using the Pythagorean theorem, with $d_{min}$ and $d_{max}$ as hypotenuses one obtains the equation $d_{max}^2 - d_{min}^2 = 2 \times r \times D$, where r is the distance from the center of the rotating shaft 23 to the fixed point 93 and D is the diameter of the rim 18. Using the equation $d_{max}^2 - d_{min}^2 = 2 \times r \times D$, D can be calculated since r is constant. Once D is calculated, using the Pythagorean theorem $$d_{min}^2 = \left(\frac{D}{2} - r\right)^2 + O^2,$$

can be calculated, where O (the offset distance) is the component distance from the fixed point 93 to the edge of the rim 18 along the rotating shaft 23. Therefore the parameter entry device 53 allows the automatic calculation of the diameter of the rim 18 and the offset of the rim 18.

FIG. 5 illustrates a display of the CRT display 59, which shows a cross sectional view of a rim 18 and tire 19. The display shows on the rim 18 a first position 70, a second position 71, a third position 72, a fourth position 73, and a fifth position 74, which correspond to positions on a rim 18 where a weight may be attached. The operator uses the keyboard 55 to move a right arrow 75 to one of the positions 70, 71, 72, 73, 74 and a left arrow 76 to one of the positions 70, 71, 72, 73, 74. The left and right arrows 75, 76 may be moved to the same position causing the balancer 10 to balance in a single plane, which is called static balancing. The left and right arrows 75, 76 may be moved to different positions causing the balancer to balance in two planes, which is called dynamic balancing, which reduces wobbling as the tire rotates.

After the left and right arrows 75, 76 are placed at positions, in FIG. 5, at the second position 71 and the fifth position 74, power to the motor 49 is started by the motor controller 48, which begins to rotate the rotating shaft 23, which rotates the wheel assembly 21 up to a speed of approximately 210 rpm or 3.5 Hz. In this embodiment the balancer may spin the wheel assembly 21 to a speed range of 185 to 230 rpm. In this example a rotational speed of 210 rpm will be used, which is a frequency of rotation $F_o$=3.5 Hz,. The unbalanced rotating wheel assembly 21 causes the rotating shaft 23 to apply a varying force on the left and right transducers 29, 30. The signal from the left transducer 29 is passed through the first AGC amplifier 31 and through the first filter 68 to the first analog to digital converter 78 of the digital display CPU 51. The first analog to digital converter uses the amplitude of the signal received to set an amplification factor and uses the amplification factor in setting the gain of the first AGC amplifier 31 and for processing the signal into digital form. This allows a reduction in the amplitude of the signal passed to the first filter 68, without losing information provided by the amplitude. FIG. 6 illustrates the attenuation provided by the first analog filter 68, by plotting the fractional amplitude of a signal passed by the first analog filter versus the frequency of the signal. According to FIG. 6 the first analog filter 68 passes a signal with a frequency between zero and twice $F_o$ with a small amount of attenuation. Signals with frequencies of a, b, and c, which are frequencies greater than several times $F_o$ are attenuated by more than 50%, wherein in this embodiment a is approximately 20 Hz, b is approximately 25 Hz, and c is approximately 60 Hz. The first analog filter 68 helps to remove higher frequency signals. Signals with frequencies between 20 Hz and 25 Hz (a and b) are caused by some mechanical deficiencies, and these signals are mostly removed by the first analog filter 68. Other mechanical noise has a frequency of 2 $F_o$ (7 Hz) and is not removed by the first analog filter 68. Signals with frequencies of approximately 60 Hz (c) are caused by the power source, and are almost completely removed by the first analog filter 68. Therefore, the first analog filter 68 helps to remove noise created by some mechanical deficiencies and the power source.

The signal is then fed into the first analog to digital converter 78, which converts the signal into a digital signal.

The signal from the first analog to digital converter 78 is fed to the first AGC amplifier, a first phase shifter 79 and a first subtraction circuit 80. In this embodiment the first phase shifter 79 shifts the phase of the signal by 180° which is half a revolution, although other embodiments may shift the phase by other odd multiples of 180°, and then feeds its output to the first subtraction circuit 80. The first subtraction circuit 80 in this embodiment subtracts the signal from the first analog to digital converter 78 from the signal from the first phase shifter 79, although another embodiment may subtract the signal from the first phase shifter 79 from the signal from the first analog to digital converter 78. The resulting signal is fed to a calculating means 81.

FIG. 7 illustrates the a signal processed from the first analog to digital converter 78, plotting voltage versus time. A first signal is output by the first analog to digital converter 78, with an offset of approximately 2.5 volts. The offset is provided to accommodate the first analog to digital converter's 78 requirement that the measurements always be in the positive realm. The shape of the first signal 90 is the result of a first harmonic signal with a frequency of approximately $F_o$ added to a second harmonic signal with a frequency of approximately $2 F_o$. The first signal 90 is fed to the first phase shifter 79 where it is shifted in phase by 180° yielding a second signal 91. The first signal 90 and second signal 91 are fed into a first subtraction circuit 80, which subtracts the first signal from the second signal 91 to yield as an output a third signal 92, which is a sine wave. The third signal 92, which is illustrated at only half of the real amplitude so that the graph of the signals can be kept separate, has an approximately zero voltage offset, since the zero order of the first and second signals 90,91 cancel out. In addition, the second harmonic signals of the first and second signals cancel each other out, leaving the third signal 92 to represent a sine wave with a frequency $F_o$.

The right force transducer 30 provides a signal to the second filter 45, which operates in the same manner as the first filter 44 to remove higher frequency signals from the signal of the right force transducer 30. The signal is then fed into the second analog to digital converter 83, with an offset of approximately 2.5 volts. The offset is provided to accommodate the second analog to digital converter's 83 requirement that the measurements always be in the positive realm. The signal from the second analog to digital converter 83 is fed to a second phase shifter 84 and a second subtraction circuit 85. In this embodiment the second phase shifter 84 shifts the phase of the signal by 180°, although other embodiments may shift the phase by other odd multiples of 180°, and then feeds its output to the second subtraction circuit 85. The second subtraction circuit 85 in this embodiment subtracts the signal from the second analog to digital converter 83 from the signal from the second phase shifter 84, although another embodiment may subtract the signal from the second phase shifter 84 from the signal from the second analog to digital converter 83. The resulting signal as is fed to the calculating means 81. In the same manner as illustrated in FIGS. 6 and 7, the second filter 44, the second analog to digital converter 83, the second phase shifter 84, and the second subtraction circuit 85 converts the signal from the right transducer 30 into a sine wave with a frequency of $F_o$.

The calculating means 81 uses the signals from the first subtraction circuit 80 and the second subtraction circuit 85 to calculate the amount and location of unbalance in the wheel assembly 21.

As the balancer operates, signals are sent from the digital CPU 51 through the communications link 56 to the video display CPU 52 which controls what is displayed on the CRT display 59. The information sent from the digital CPU 51 to the video display CPU 52 is sent in the form of a series of fields with a heading indicating the start of each message. The messages are made up of fixed length message fields and arranged so that the most changeable data fields are placed closer to the start of a message, wherein the number of fields in a message may be cut off. If there is no change in the data so there is not need to retransmit the data, and in this embodiment of the invention the digital display CPU 51 sends a new start message heading without any other data to the video display CPU 52, indicating the lack of new data and freeing the digital display CPU 51 for other functions. In the event that new data is generated which makes the old data not yet transmitted outmoded the old message is terminated and the digital display CPU 51 sends a new start heading with the new data to the video display CPU 52. A series of formats for the display of information may be stored on a CD ROM or other storage means 95 and may be called by the operator and as illustrated in FIG. 10.

After the calculating means determines the location of unbalance messages are sent to either the digital display 58 or the CRT display 59 to indicate to the operator the weights and locations needed to balance the wheel assembly.

FIG. 8 is an enlarged view of another embodiment of a parameter entry device 99, which may be used in place of the parameter entry device 53 in a balancer such as illustrated in FIG. 1. The parameter entry device comprises a first angular transducer joint 63 mechanically connected to the main balancer body 28, a first arm piece 64 with a first end mechanically connected to the first angular transducer joint 63 and a second end, a second angular transducer joint 65 mechanically connected to the second end of the first arm piece 64, a second arm piece 66 with a first end mechanically connected to the second angular transducer joint 65 and a second end, and a probe 67 mechanically connected to the second end of the second arm piece 66. The first and second angular transducer joints 63, 65 are electronically connected to the digital display CPU 51 to send signals to the digital display CPU 51 indicating the angles of the first and second angular transducer joints 63, 65. The operator moves the parameter entry device 53 until the probe 67 is placed against the edge of the rim 18 of the wheel assembly 21. Once the probe 67 is placed against the edge of the rim 18, signals are sent from the first and second angular transducer joints 63, 65 to the digital display CPU 51 indicating the angles of the first and second angular transducer joints 63, 65. The digital display CPU 51 uses the fixed length $L_1$ of the first arm piece 64, which is the distance between the center of the first angular transducer joint 63 and the center of the second angular transducer joint 65, and the fixed length $L_2$ of the second arm piece 66, which is the distance between the center of the second angular transducer joint 65 and the tip of the probe 67, and the angles indicated from the signals from the first and second angular transducer joints 63, 65,. and the height r from the center of the rotating shaft 23 to the center of the first angular transducer joint 63 to calculate the radius or diameter of the rim 18 and the offset of the rim 18.

FIG. 9 is an enlarged view of another embodiment of a parameter entry device 100, which may be used in place of the parameter entry device 53 in a balancer such as illustrated in FIG. 1. The parameter entry device 100 comprises an angular transducer joint 102 mechanically as connected to the main balancer body 28, an arm 103 with a first end mechanically connected to the angular transducer 102 and a second end, and a ranging device such as an ultrasonic distance detector 104 mechanically connected to the second end of the arm 103. The angular transducer joint 102 allows the arm 103 to be moved in a plane perpendicular to the rotating shaft 23. The ultrasonic distance detector 104 transmits a signal substantially parallel to the rotating shaft 23. The arm 103 is moved until the ultrasonic distance detector 104 detects a transition which indicates the edge of a rim 18. A signal from the angular transducer joint 102 indicating the angle of the angular transducer joint 102 and a signal from the ultrasonic distance detector 104 are sent to the digital display CPU 51 which calculates the diameter of the rim and the offset of the rim.

The above described embodiment uses the invention on a hard mount wheel balancer. Other embodiments of the invention could be used on a soft mount wheel balancer.

Other embodiments may use only a digital display and not a CRT display. In addition other embodiments may use a multiplexer to allow the replacement of the two analog to digital converters, the two phase shifters, and the two subtraction circuits with a single analog to digital converter, a single phase shifter and a single subtraction circuit.

While preferred embodiments of the present invention have been shown and described herein, it will be appreciated that various changes and modifications may be made therein without departing from the spirit of the invention as defined by the scope of the appended claims.

What is claimed is:

1. A wheel balancer device for balancing a wheel assembly of a tire and rim with an outer edge, comprising:

a balancer main body;

a rotating shaft with a center, mechanically connected to the balancer main body;

means for mounting the wheel assembly on the shaft;

a cord with a first end;

a fixed point through which the cord passes;

means for calculating the distance from the fixed point to the outer edge of the rim when the first end of the cord is placed adjacent to the outer edge of the rim means for measuring an angle of rotation of the shaft as the rim is rotated with the card placed adjacent to the outer edge of the rim; and means for recording the distance from the fixed point to the outer edge of the rim and the angle of rotation of the rotating shaft as the rim is rotated with the cord placed adjacent to the outer edge of the rim.

2. A wheel balancer, as claimed in claim 1, further comprising, means for calculating the shortest distance between the outer edge of the rim and the fixed point and the longest distance between the outer edge of the rim and the fixed point.

3. A wheel balancer, as claimed in claim 2, further comprising means for calculating the diameter of the wheel and the offset distance between the rim and the fixed point by using the shortest distance between the outer edge of the rim and the fixed point and the longest distance between the outer edge of the rim and the fixed point and the distance between the fixed point and the center of the rotating shaft.

* * * * *